(12) United States Patent
Schneider et al.

(10) Patent No.: US 11,695,648 B2
(45) Date of Patent: Jul. 4, 2023

(54) METHOD FOR SUPPORTING SERVICE LEVEL AGREEMENT MONITORING IN A SOFTWARE DEFINED NETWORK AND CORRESPONDING SOFTWARE DEFINED NETWORK

(71) Applicant: NEC Laboratories Europe GmbH, Heidelberg (DE)

(72) Inventors: Fabian Schneider, Darmstadt (DE); Anton Matsiuk, Hamburg (DE); Dimitrios Gkounis, Kingston Upon Thames (GB); Johannes Lessmann, Gummersbach (DE)

(73) Assignee: NEC CORPORATION, Tokyo (JP)

( * ) Notice: Subject to any disclaimer, the term of this patent is extended or adjusted under 35 U.S.C. 154(b) by 607 days.

(21) Appl. No.: 16/640,744

(22) PCT Filed: Aug. 23, 2017

(86) PCT No.: PCT/EP2017/071249
§ 371 (c)(1),
(2) Date: Feb. 21, 2020

(87) PCT Pub. No.: WO2019/037846
PCT Pub. Date: Feb. 28, 2019

(65) Prior Publication Data
US 2020/0204460 A1 Jun. 25, 2020

(51) Int. Cl.
*H04L 41/5009* (2022.01)
*H04L 43/0852* (2022.01)
(Continued)

(52) U.S. Cl.
CPC ...... *H04L 41/5009* (2013.01); *H04L 43/0852* (2013.01); *H04L 43/12* (2013.01); *H04L 47/10* (2013.01)

(58) Field of Classification Search
None
See application file for complete search history.

(56) References Cited

U.S. PATENT DOCUMENTS 9,787,559 B1* 10/2017 Schroeder ............... H04L 43/55
2002/0145981 A1* 10/2002 Klinker ................. H04L 47/762
370/244
(Continued)

FOREIGN PATENT DOCUMENTS

WO 2015/000517 1/2015

OTHER PUBLICATIONS

Cascone, Carmelo et al. "SPIDER: Fault Resilient SDN Pipeline with Recovery Delay Guarantees," 2016 IEEE Netsoft Conference and Workshops, Jun. 6, 2016, pp. 296-302, XP032917813.
(Continued)

*Primary Examiner* — Kevin T Bates
*Assistant Examiner* — Emad Siddiqi
(74) *Attorney, Agent, or Firm* — Leydig, Voit & Mayer, Ltd.

(57) ABSTRACT

A method supports service level agreement monitoring in a software defined network. The software defined network has forwarding elements and a software defined network controller for controlling the forwarding elements. Data flows are transmitted between a first end-path forwarding element, of the forwarding elements, and a second end-path forwarding element, of the forwarding elements, via at least one intermediate forwarding element, of the forwarding elements. The software defined network controller configures the intermediate forwarding element such that a probe triggering packet is generated based on local information of the intermediate forwarding element. The software defined network controller configures at least one of the first end-path forwarding element or the second end-path forwarding
(Continued)

element such that an end-to-end probing is triggered based on receiving the probe triggering packet. The end-to-end probing is performed in order to detect a service level agreement violation.

20 Claims, 5 Drawing Sheets

(51) Int. Cl.
    *H04L 43/12* (2022.01)
    *H04L 47/10* (2022.01)

(56) References Cited

U.S. PATENT DOCUMENTS

| | | | |
|---|---|---|---|
| 2003/0185210 A1* | 10/2003 | McCormack | H04L 43/50 370/392 |
| 2014/0269288 A1 | 9/2014 | Crisan et al. | |
| 2018/0123930 A1* | 5/2018 | Zhang | H04L 43/20 |

OTHER PUBLICATIONS

Kempf, James et al. "Scalable Fault Management for OpenFlow," 2012 IEEE International Conference on Communications (ICC), Jun. 10, 2012, pp. 6606-6610, XP032274514.

* cited by examiner step ❶: Preconfiguration with Packet Templates
step ❶: S2 detects congestion
step ❷: S2 notifies S1
step ❸: S1 generates ping probe packet
step ❹: S3 generates pong probe packet

METHOD FOR SUPPORTING SERVICE LEVEL AGREEMENT MONITORING IN A SOFTWARE DEFINED NETWORK AND CORRESPONDING SOFTWARE DEFINED NETWORK

CROSS-REFERENCE TO PRIOR APPLICATIONS

This application is a U.S. National Phase Application under 35 U.S.C. § 371 of International Application No. PCT/EP2017/071249, filed on Aug. 23, 2017. The International Application was published in English on Feb. 28, 2019 as WO 2019/037846 under PCT Article 21(2).

FIELD

The present invention relates to supporting service level agreement (SLA) monitoring in a software defined network (SDN).

BACKGROUND

In recent years network monitoring is a crucial task for Internet service providers (ISPs) to ensure their network is working as expected and that the service level agreements (SLAs) with their customers are fulfilled.

Network monitoring is deployed by using dedicated monitoring probes that generate and receive test traffic. The term test traffic may also be designated as probe traffic, where probe packets are generated and transmitted in the network for testing and determining network parameters. FIG. 1 illustrates an application scenario of a typical network monitoring probe deployment. The goal is to perform full end-to-end path monitoring to ensure that the whole network is working as intended. The monitoring probes are located close to the customer edge inside the points of presence of the ISPs. The monitoring probes are attached to the network like regular customers would be connected, i.e. by using the access technologies such as DSL, Cable, PON, FttH, etc. that are present at the point of presence (PoP).

While the network is managed by the network management system (NMS), the monitoring probes are orchestrated by a monitoring manager, which may receive some information from the Operations Support System and Business Support System (OSS/BSS system). Typically, such information may include guarantees given to the customers according to the service level agreements (SLAs). Furthermore, this information may include information about the topology of the network, especially with respect to the location of the monitoring probes.

The reasons for placing monitoring probes at the customer edge of the network are:

(i) that this is the place where the customer would also connect, and (ii) that this does not interfere with the management of the network.

These reasons coincide with the goal of end-to-end probing.

In the field of network monitoring, there are diverse network probing mechanisms which may include the following:

Round-trip time (RTT) measurement: Usually utilizing a mechanism similar to the ping tool. A monitoring probe A sends a packet to a monitoring probe B, which sends back a reply to the monitoring probe A, and then the monitoring probe A can calculate the RTT by subtracting the time-stamp of the reply from the time-stamp of the initial probe packet.

One-way delay (OWD) measurement: Being similar to round-trip time measurements, however this requires synchronized and accurate clocks in both monitoring probes.

Jitter: For jitter or packet delay variation measurements typically equally spaced sequences of packets are generated at the source monitoring probe and their inter-arrival time variations are recorded at the target monitoring probe.

Throughput measurement: A source monitoring probe generates as much traffic as possible and tries to saturate the available capacity of the network toward the target monitoring probe, the target monitoring probe will then determine how much of the generated traffic was received.

Available Bandwidth (AvBW) estimation: This is similar to a throughput measurement, but the difference is that here the probe traffic is not filling up the link capacity. This is achieved by sending only probe packet pairs or probe packet trains to the target monitoring probe and then inferring the bandwidth from the differences of the inter-packet timings when sending and receiving the probe traffic.

The inventors have recognized that conventional methods and systems for network monitoring have the problem that relevant probing techniques require careful crafting of the probe traffic. However, this is not possible in network elements, neither in legacy networks nor in typical software defined networks (SDNs) such as networks controlled by OpenFlow. With regard to OpenFlow it is exemplarily referred to non-patent literature of Open Networking Foundation: "OpenFlow Switch Specification", Version 1.3.4 (Mar. 27, 2014—TS-019) retrievable at: opennetworking.org/images/stories/downloads/sdn-resources/onf-specifications/openflow/openflow-switch-v1.3.4.pdf".

Hence, the known network monitoring systems are implemented with dedicated monitoring probe devices and a probing orchestrator, which is cumbersome and inflexible. Typically, the network monitoring is deployed using the dedicated probes that periodically generate and receive test traffic.

In the non-patent literature of Sally Floyd and van Jacobson: "*Random early detection gateways for congestion avoidance*", *IEEE/ACM Transactions on networking* 1.4 (1993), 397-413, Random Early Detection (RED) gateways for congestion avoidance in packet-switched networks are described. The Random Early Detection (RED) scheme detects congestion by calculating the average queue size and consequently drops or remarks packets to reduce the average occupied queue size. The Transmission Control Protocol (TCP) reacts on packet drops by reducing receive windows and thus throttling the bandwidth of the flows. The scheme, however, does not impact behavior of User Datagram Protocol (UDP) flows which, for example, in industrial domains may cover majority of traffic.

The Early Congestion Notification (ECN) mechanism performs marking of the flows in congested queues with ECN bits of the IP (Internet Protocol) or TCP headers towards the receiver of a unidirectional flow. The ECN mechanism also includes an echo notification of the transmitter about the congestion and consequent throttling of the flow's bandwidth. Although the ECN bits of the IP header are typically used in the most common implementations which also potentially enables ECN operation for UDP flows, the ECN mechanism implementations for UDP strongly depend on the application layer protocols, such as the Real-time Transport Protocol (RTP), which are not always available—for instance in the Internet of Things (IoT) or industrial devices—or the ECN implementations may differ significantly. In this regard, it is referred to the non-patent literature of Stephen McQuistin and Cohn S. Perkins: "*Is Explicit Congestion Notification usable with UDP?*", *Proceedings of the* 2015 *ACM Conference on Internet Measurement Conference, ACM* 2015.

Both mechanisms previously described, i.e. RED and ECN, are only able to react on network congestions by reducing the flow rates, but they cannot perform sophisticated reactions to maintain service-level agreement (SLA) guarantees for mission-critical flows. Additionally, packet dropping or remarking could be disruptive for mission-critical flows with strict SLAs.

In the non-patent literature of Mohammad Alizadeh et al.: "*CONGA: Distributed Congestion-Aware Load Balancing for Datacenters*", *ACM SIGCOMM Computer Communication Review*, Vol. 44, No. 4, ACM 2014, the flow packets piggyback congestion information to notify the network endpoints about congestion. The packet congestion metrics are updated in each hop along the path until they first reach their destination and then these metrics are piggybacked in packets transmitted in the reverse direction to provide feedback to the source traffic node. However, there is no immediate response to a local queue congestion event.

Furthermore, network scenarios with mission-critical services and data flows may require rapid detection of SLA violations as well as rapid execution of respective reactions. In such scenarios, mechanisms according to known methods and systems which rely on constant interaction with the software defined network controller may become ineffective and/or non-scalable. Further, the dependence of such mechanisms on the software defined network controller makes them inefficient in controller failure cases.

SUMMARY

An embodiment of the present invention provides a method that supports service level agreement monitoring in a software defined network. The software defined network has forwarding elements and a software defined network controller for controlling the forwarding elements. Data flows are transmitted between a first end-path forwarding element, of the forwarding elements, and a second end-path forwarding element, of the forwarding elements, via at least one intermediate forwarding element, of the forwarding elements. The software defined network controller configures the intermediate forwarding element such that a probe triggering packet is generated based on local information of the intermediate forwarding element. The software defined network controller configures at least one of the first end-path forwarding element or the second end-path forwarding element such that an end-to-end probing is triggered based on receiving the probe triggering packet. The end-to-end probing is performed in order to detect a service level agreement violation.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
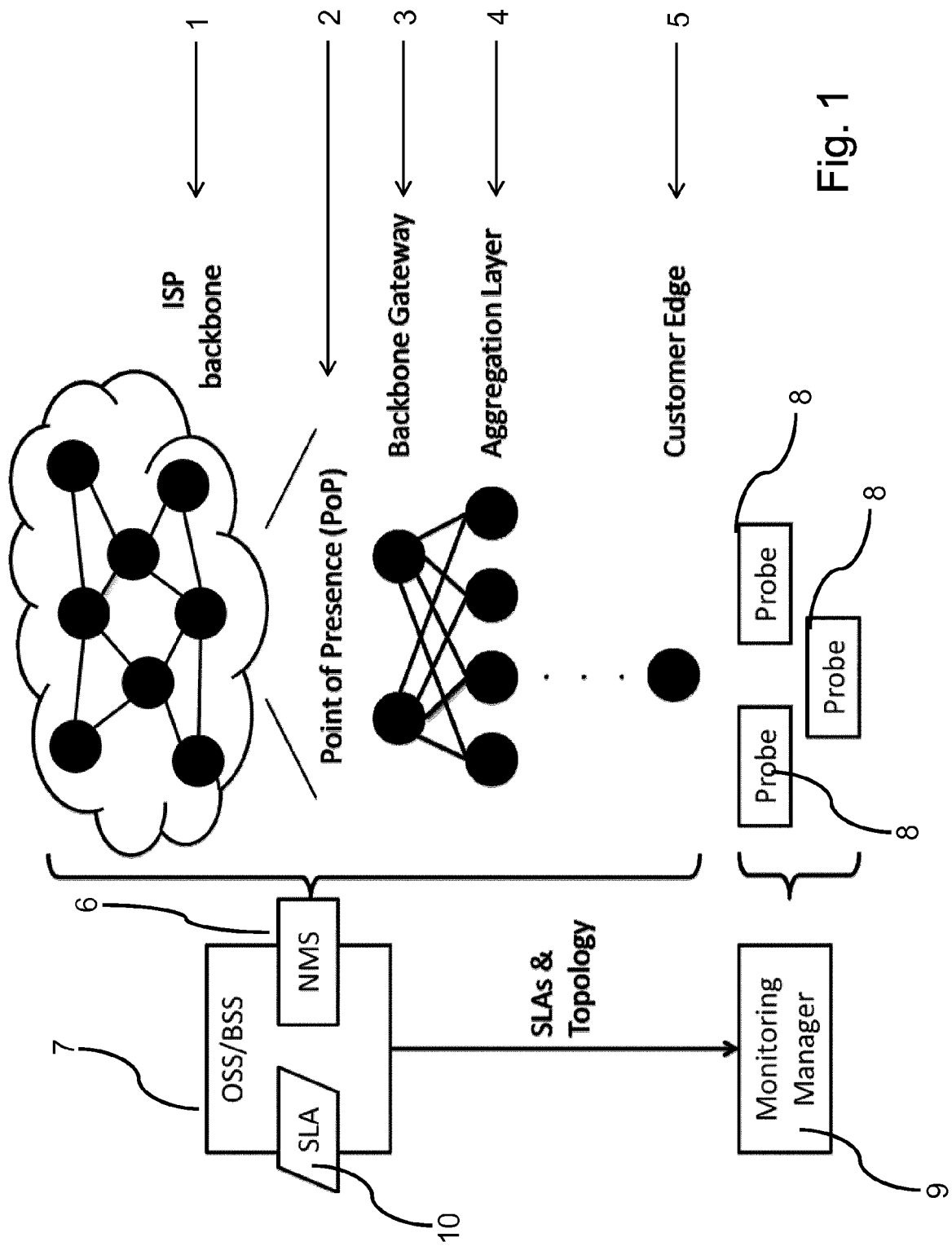
FIG. 1 is a schematic view illustrating an application scenario of a typical network monitoring probe deployment.

In view of the above, embodiments of the present invention improve and further develop a method for supporting service level agreement monitoring in a software defined network and a software defined network for supporting such service level agreement monitoring in such a way that the above issues are overcome or at least partially alleviated.

Such improvements are provided by, for example, a method for supporting service level agreement monitoring in a software defined network. The software defined network includes forwarding elements and a software defined network controller for controlling the forwarding elements. Data flows are transmitted between a first end-path forwarding element and a second end-path forwarding element via at least one intermediate forwarding element. The software defined network controller configures the intermediate forwarding element such that a probe triggering packet is generated based on local information of the intermediate forwarding element. The software defined network controller configures at least one of the end-path forwarding elements such that an end-to-end probing is triggered based on receiving the probe triggering packet, and the end-to-end probing is performed in order to detect a service level agreement violation.

Furthermore, such improvements are provided by, for example, a software defined network for supporting service level agreement monitoring. The software defined network includes forwarding elements and a software defined network controller for controlling the forwarding elements. The forwarding elements include a first end-path forwarding element, a second end-path forwarding element, and at least one intermediate forwarding element. Data flows are transmitted between the first end-path forwarding element and the second end-path forwarding element via the at least one intermediate forwarding element. The software defined network controller is operable to configure the intermediate forwarding elements such that a probe triggering packet is generated based on local information of the intermediate forwarding element. The software defined network controller is further operable to configure at least one of the end-path forwarding elements such that an end-to-end probing is triggered, and the end-to-end probing is performed in order to detect a service level agreement violation.

According to an embodiment of the present invention, it has first been recognized that in the context of service level agreement monitoring in software defined networks (SDNs) an enormous improvement, in particular with regard to the efficiency of the service level agreement (SLA) monitoring, can be provided by employing forwarding elements, e.g.

switches, of the software defined network (SDN) as monitoring probes, where an end-to-end probing performed by end-path forwarding elements is initiated and triggered by an intermediate forwarding element. Specifically, the software defined network includes forwarding elements and a software defined network controller for controlling the forwarding elements, where data flows are transmitted on a path between a first end-path forwarding element and a second end-path forwarding element via at least one intermediate forwarding element. According to embodiments of the invention, the software defined network controller configures one or more intermediate forwarding elements such that a probe triggering packet is automatically generated based on local information of the intermediate forwarding elements in order to notify the end-path forwarding elements. Further, the software defined network controller configures at least one of the end-path forwarding elements such that the end-to-end probing is automatically triggered based on receiving the probe triggering packet transmitted from the intermediate forwarding element. The probe triggering packet may be transmitted from the intermediate forwarding element to the first end-path forwarding element and/or to the second end-path forwarding element. Thus, the end-to-end probing can be triggered at and/or performed by the first end-path forwarding element and/or the second end-path forwarding element. The end-to-end probing is performed in order to detect a service level agreement violation on the path between the first end-path forwarding element and the second end-path forwarding element. Hence, a method and a software defined network according to the present invention provide an improved and more efficient service level agreement monitoring.

The embodiments of the present invention provide a rapid and/or immediate response to a local queue congestion event, as the probe triggering packet can be instantly generated to provide feedback to the affected endpoints, i.e. to the end-path forwarding elements. The end-path forwarding elements, in turn, can instantly start the end-to-end probing when receiving the probe triggering packet. This immediate feedback mechanism together with the immediate end-to-end probing may be crucial in order to avoid strict service level agreement violations.

Aspects of the present invention may extend to corresponding systems, methods, and computer program products such as computer readable storage media having instructions stored thereon which are operable to program a programmable computer processor to carry out a method as described in the aspects and embodiments set out below or recited in the claims and/or to program suitably adapted computers to provide the software defined network and/or the forwarding elements recited in any of the claims.

According to the present invention, it has further been recognized that methods and systems known from practice do not address the following issues:

Transient network events, e.g. temporal network congestions or link quality degradation: To capture such events according to methods and systems known from practice, the generation of probe packets might only happen via the control channel loop. The software defined network controller would identify the transient event, if at all, e.g. by constantly polling the switches for network statistics, and would instruct the switches to start service level agreement measurement campaigns. According to the invention, it has been recognized that the interactions via a control channel loop would significantly slow down the operations, due to various sources of delay, making such approach inappropriate for rapid and transient network events (e.g. rapid queue growth or short and periodic link degradation). Furthermore, to capture the transient events, a proactive constant probing would lead to an excessive additional network load which increases with probing frequency and the number of monitored paths. However, these issues can be overcome or at least partially alleviated by embodiments of the present invention.

In-switch-accelerated reactions to service level agreement violations (e.g. local switchovers of critical flows): According to methods and systems known from practice, if at all, the switches would inform the controller either about the absolute values of measured parameters or about threshold crossing of these parameters (i.e. service level agreement violation). Based on this information, the software defined network controller might take decisions, for example to reroute critical flows which have violated service level agreements. Any such reactions to service level agreement violations would have to be assisted by the software defined network controller, again, exposing the control channel delays and scalability issues. However, these issues can be overcome or at least partially alleviated by embodiments of the present invention.

The term "monitoring probe" may refer in particular in the claims, preferably in the description, to an entity such as a program or other device, preferably located at a key juncture, in a network for the purpose of monitoring or collecting data about network activity. Furthermore, for example, a monitoring probe may perform an action and/or send out an object, such as a probe packet, used for the purpose of learning something about the state of the network. For example, an empty message can be sent simply to see whether the destination actually exists. Thus, according to the present invention, a first end-path forwarding element and/or a second end-path forwarding element are configured in such a way that they may function as monitoring probes for performing end-to-end probing between them.

The term "probe triggering packet" may refer in particular in the claims, preferably in the description, to a packet used for preferably automatically launch an end-to-end probing on a path between a first end-path forwarding element and a second end-path forwarding element.

The term "probe packet" may refer in particular in the claims, preferably in the description, to a packet used in an active measurement experiment/task, in particular of an end-to-end probing, to collect knowledge on a given network parameter of interest, such that service level agreement violations can be detected.

According to embodiments of the invention the local information of the intermediate forwarding element may include one or more local information parameters that impact and/or refer to the link quality. For example, the local information of the intermediate forwarding element may include one or more local information parameters such as a queue occupancy parameter, a CPU (central processing unit) load parameter, a bit error parameter, an SNR (signal-to-noise ratio) parameter and/or a retransmission parameter. Thus, the probe triggering packet can be generated based on a local event of the intermediate forwarding element.

According to embodiments of the invention the end-to-end probing may include a measurement task that, for example, include a round-trip time measurement, a one-way delay measurement, a jitter measurement, a throughput measurement and/or an available bandwidth estimation.

According to embodiments of the invention, it may be provided that the software defined network controller configures the end-path forwarding elements such that one or more probe packets for performing the measurement task of the end-to-end probing are generated by at least one of the end-path forwarding elements.

According to embodiments of the invention, it may be provided that generation and/or handling of the probe triggering packet is temporally decoupled from the software defined network controller. Furthermore, it may be provided that generation and/or handling of probe packets, which are used for performing the measuring task of the end-to-end probing, is/are temporally decoupled from the software defined network controller. Thus, one or more measurement tasks—and thus a measurement campaign—for performing the end-to-end probing can be programmed in a flexible, controller-independent and efficient way on forwarding elements of the network, e.g. on switches in the context of OpenFlow.

According to embodiments of the invention, the one or more probe packets may include a ping probe packet for performing the measuring task of the end-to-end probing, where the ping probe packet is generated by the first end-path forwarding element. Thus, there is no need to deploy a dedicated monitoring probe device for generating a ping probe packet that is to be used for performing end-to-end probing and measurement tasks. Rather, it is possible that ping probe packets can be generated directly on a forwarding element of the network. Furthermore, timing inaccuracies can be reduced, in particular compared to an approach where the software defined network controller would perform probe packet generation and/or time stamping. Further, interactions on the control channel, i.e. interactions between the software defined network controller and the first end-path forwarding element can be kept to a minimum.

The term "ping probe packet" may refer in particular in the claims, preferably in the description, to an initial probe packet that is sent from the first end-path forwarding element functioning as source monitoring probe to the second end-path forwarding element functioning as target monitoring probe.

According to embodiments of the invention, the one or more probe packets may include a pong probe packet for performing the measurement task of the end-to-end probing, where the pong probe packet is generated by the second end-path forwarding element. Thus, at the second end-path forwarding element, the pong probe packet may be generated as new probe packet that is used for the return path of the measurement task of the end-to-end probing. For example, in the context of a round-trip measurement procedure, the second end-path forwarding element needs to have the capability to modify the header fields of a received ping probe packet in which e.g. the time stamp can be stored. Furthermore, returning the ping probe packet back to the first end-path forwarding element will require changes to the packet header of the ping probe packet, especially when there is no direct connection between the first end-path forwarding element and the second end-path forwarding element and the ping probe packet that is to be returned will need to traverse other network elements. Hence, in this case, the packets need to be routed appropriately and might involve also changes on the IP addresses, etc. Thus, by generating the pong probe packet, which is a new probe packet and which is used as reply packet, this requirement can be enabled with minimal changes to the packet header an facilitates routing.

The term "pong probe packet" may refer in particular in the claims, preferably in the description, to a reply probe packet that is sent out from the second end-path forwarding element functioning as target monitoring probe. For example, the pong probe packet may be sent as reply to the first end-path forwarding element, e.g. in the context of a round-trip time measurement as measuring task in the context of an end-to-end probing.

According to embodiments of the invention, the software defined network controller may configure the forwarding elements to generate the one or more probe packets for performing the end-to-end probing and/or to generate probe triggering packets by creating packet template information that is provided to the forwarding elements, where the packet template information includes one or more packet templates and/or packet template handling instructions. Thus, the software defined network controller can configure the forwarding elements for packet generation, in particular the first end-path forwarding element and/or the second end-path forwarding element for probe packet generation as well as the intermediate forwarding element for probe triggering packet generation. For example, the concept of Packet Template (PT) as exemplarily specified in the document WO 2015/000517 A1 can be used in an advantageous way for packet generation on forwarding elements. Document WO 2015/000517 A1 describes a mechanism for generating packets directly on forwarding elements of a software defined network. This mechanism for programming in-switch generation may be used according to an embodiment of the present invention in order to improve, enrich and simplify network monitoring and service level agreement monitoring in software defined networks, namely by generating probe triggering packets and probe packets using the Packet Template (PT) mechanism. Advantageously, the most network elements from the customer edge all the way up to the backbone gateway are SDN-enabled and in-switch packet generation enabled. Hence, by using packet templates the load on the control channel between the forwarding elements and the software defined network controller is significantly reduced.

According to embodiments of the invention, the forwarding elements may be configured to generate the probe triggering packet and/or the one or more probe packets based on the provided packet template information. This enables the generation of the probe triggering packet and of the probe packets and thus of the end-to-end probing in a way that is temporally decoupled from the supervision of the software defined network controller.

According to embodiments of the invention, the triggering instructions may be provided to the forwarding elements by including them into the packet template information. Thus, it is enabled in an easy and simple way to provide and to install triggering instructions for the generation of probe triggering packets and of probe packets, such as ping probe packets and/or pong probe packets, on the forwarding elements by the software defined network controller.

According to embodiments of the invention, the triggering instructions may include a parameter threshold for one or more local information parameters that impacts and/or refers to the link quality, where the parameter threshold is employed as trigger for generating the probe triggering packet, in particular at the intermediate forwarding element. Thus, the probe triggering packet can be generated based on a local event of the intermediate forwarding element.

According to embodiments of the invention, the triggering instructions may include configuring, in particular at the end-path forwarding elements, a reception of a predetermined incoming packet, in particular a probe triggering packet or a ping probe packet, as trigger for generating a new probe packet, in particular a ping probe packet or a pong probe packet for performing the end-to-end probing. For example, the triggering instructions may include that, at the first end-path forwarding element, a reception of a predetermined packet such as the probe triggering packet is configured as trigger for generating a new ping probe packet. Hence, an end-to-end probing can be efficiently initiated and started. Further, the triggering instructions may include that, at the second end-path forwarding element, a reception of a predetermined ping probe packet is configured as trigger for generating a new pong probe packet. This enables in an easy way a triggering of a generation of a pong probe packet based on a received ping probe packet. Thus, a measurement task of the end-to-end probing can be suitably programmed, e.g. for performing a round-trip time measurement. Furthermore, it may be provided that the reception of the probe triggering packet is used as trigger for a complete measurement campaign (such as a set of probe packets). For example, OpenFlow group tables may be utilized to group together a set of packet generation rules including timings/delays, where the packet generation rules are installed on forwarding elements by the packet template information.

According to embodiments of the invention, the probe triggering packet may include information about the intermediate forwarding element that has generated the probe triggering packet due to local information with regard to link quality degradation. Thus, the probe triggering packet includes information about the intermediate forwarding element, which identified the local congestion and generated this probe triggering packet. Hence, the end-to-end probing between the first end-path forwarding element and the second end-path forwarding element can be passed through the congested intermediate forwarding element.

According to embodiments of the invention, it may be provided that upon completion of the end-to-end probing the first end-path forwarding element and/or the second end-path forwarding element decides locally whether a service level agreement violation is detected by evaluating result information obtained by the end-to-end probing. In this regard the result information can be evaluated based on an SLA-compliant threshold, which has been preconfigured/preprogrammed by the software defined network controller on the respective end-path forwarding element. Hence, a service level agreement violation can be efficiently detected.

According to embodiments of the invention, it may be provided that a path switchover is performed, if a service level agreement violation is detected by the end-to-end probing. Thus, a service level agreement violation event can be defined as a trigger to perform a path switchover in order to meet and/or fulfill the intended SLA guarantees.

According to embodiments of the invention, the path switchover may be performed by using a backup path. The backup path may be preconfigured, so that a rapid reaction to the identification of a service level agreement violation can be provided for maintaining and/or fulfilling service level agreement guarantees.

According to embodiments of the invention, it may be provided that a part of the first end-path forwarding element's load is shifted to a backup path, if a service level agreement violation is detected by the end-to-end probing. Thus, service level agreement violations can be mitigated by performing flow re-routing reactions. Further, the backup path may be preconfigured, so that a rapid reaction to the identification of a service level agreement violation can be provided for maintaining and/or fulfilling service level agreement guarantees.

According to embodiments of the invention, an end-to-end probing may be additionally performed on the backup path. Hence, instead of just checking the active path, it may be provided that probe packets are also generated on the backup path in order to avoid changing to a path that also violates the service level agreement. Advantageously, a path would thus only be changed if the active path is violating the service level agreement and if the active path SLA metrics are worse than those of the backup path. Thus, a more efficient SLA mitigation mechanism can be provided.

According to embodiments of the invention, it may be provided that Quality of Service (QoS) remarking for promotion or demotion of the data flows is performed in order to meet and/or maintain predetermined service level agreement guarantees, if a service level agreement violation is detected by the end-to-end probing. Thus, a service level agreement violation event can be defined as a trigger to perform QoS remarking in order to meet and/or fulfill the intended service level agreement guarantees. Hence, service level agreement violations can be mitigated by performing QoS remarking reactions.

According to embodiments of the invention, a forwarding element, in particular a SDN switch, for supporting service level agreement monitoring in a software defined network may be provided, where the forwarding element including:
a) at least one input queue per ingress port;
b) one or more data flow tables for applying a predetermined action to incoming data packets that are identified by a predetermined match expression;
c) at least one output queue per egress port;
d) a queue occupancy monitoring function, which includes a queue trigger table for detecting high queue occupancy based on a predetermined queue occupancy threshold; and
e) a packet template table.

One or more embodiments of the present invention provide a method that enables SDN switches to detect and to react to service level agreement violations to ensure meeting the service level agreements for mission-critical data flows. A method according to an embodiment of the invention can overcome the limitations of controller-side detection in terms of scalability, latency and failure by leveraging an in-switch packet generation mechanism such as Packet Templates (PT) exemplarily specified in the document WO 2015/000517 A1, where one or more of the following aspects may be implemented:

The Application Programming Interface (API) of Packet Templates is extended by defining queue occupancy parameter and/or other link quality parameters as triggering conditions for in-switch packet generation.

Providing a mechanism in which end-to-end probing to identify any service level agreement violations is triggered by the reception of a data plane packet, which had been previously generated by a switch local event, in particular independently from the software defined network controller.

Providing a mechanism in which an in-network detection of service level agreement violations triggers an in-network reaction for the affected data flows, i.e. path switchover or QoS (CoS/DSCP) remarking for promotion or demotion of the flows in order to maintain the required service level agreement guarantees. In this regard, QoS refers to "Quality of Service", CoS refers to "Class of Service" and DSCP refers to "Differentiated Services Code Point".

Providing an architecture which combines the aforementioned mechanisms to enable rapid in-switch mitigation of service level agreement violations and to minimize interactions with the software defined network controller.

One or more embodiments of the present invention leverage a mechanism of in-switch packet generation, where SDN switches are enabled to detect and react to service level agreement violations without dedicated monitoring probe devices and without proactive constant probing such that any relevant communication with a software defined network controller is kept to a minimum as possible.

One or more embodiments of the present invention provides that an ability to trigger end-to-end service level agreement monitoring is effectively combined with an Application Programming Interface (API) of Packet Templates in response to transient network events, for example, based on a queue occupancy parameter and/or other link quality degradation parameters.

One or more embodiments of the invention may be focused on assurance of service level agreement guarantees for mission-critical services for which mitigation mechanisms including interactions with the controller may break QoS requirements. To assure rapid service level agreement violation detection and mitigation, switch local information such as high queue occupation is exploited and in-switch mechanisms allowing detecting and mitigating service level agreement violations solely in the data plane are presented.

One or more embodiments of the present invention may provide one or more of the following advantages:
No need to deploy dedicated monitoring probe devices;
Instant detection and reaction to local network forwarding element events;
Keeping detection and reaction to service level agreement violations independent from SDN control mechanisms, for example in case of software defined network controller failure and/or an unreliable control channel;
Reducing switch to controller interactions;
Avoiding measurements while the network condition is "green"/"ok". Measurements and end-to-end probing may be only launched in overload situations;
Operating mostly on the data-plane and thus requiring minimum control plane interactions.

There are several ways how to design and further develop the teaching of the present invention in an advantageous way. To this end it is to be referred to the dependent patent claims on the one hand and to the following explanation of preferred embodiments of the invention by way of example, illustrated by the drawing on the other hand. In connection with the explanation of the preferred embodiments of the invention by the aid of the drawing, generally preferred embodiments and further developments of the teaching will be explained.

FIG. 1 shows an application scenario of a typical network monitoring probe deployment. FIG. 1 shows an Internet backbone 1 of an Internet service provider (ISP). The Internet backbone 1 is accessible by a Point of Presence (PoP) 2, where network connection may be provided from one or more backbone gateways 3 via an aggregation layer 4 through to the customer edge 5. The network is managed by a network management system (NMS) 6 that is located within a system/business support system (OSS/BSS) 7. The OSS/BSS 7, operated together by the ISP, are used to support a range of telecommunication services. According to FIG. 1, monitoring probes 8 are placed at the customer edge 5 of the network. The monitoring probes 8 are orchestrated by a monitoring manager 9 that may receive information from the OSS/BSS 7. This information may include the guarantees given to the customers according to service level agreements (SLAs) 10. Furthermore, this information may include information about the topology of the network, in particular with respect to the location of the monitoring probes.

Figure 2:
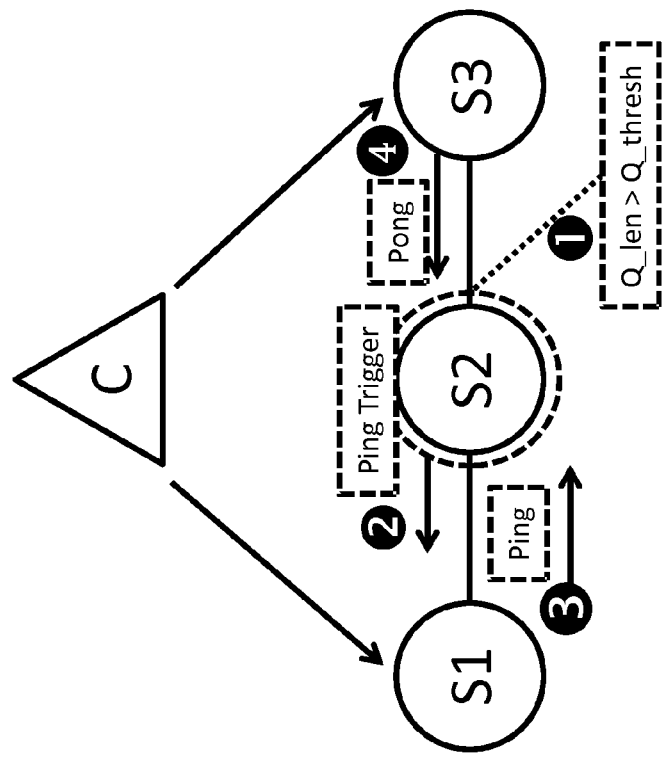
FIG. 2 is a schematic view illustrating a method and a software defined network according to an embodiment of the present invention.
Figure 2:
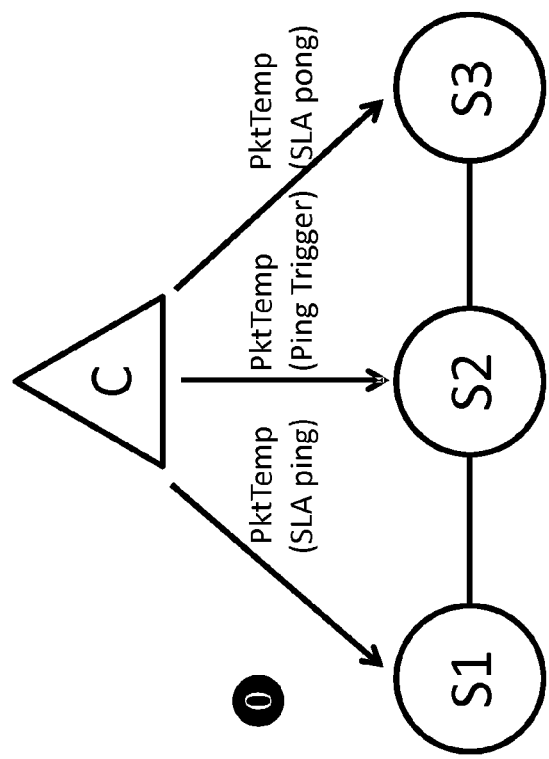

FIG. 2 shows a schematic view illustrating a method and a software defined network according to an embodiment of the present invention, where service level agreement (SLA) measurements are triggered by a queue occupation event, i.e. based on a queue occupancy parameter threshold "Q_thresh".

The embodiment of FIG. 2 provides an in-switch-assisted service level agreement violation detection mechanism, where its functionality is implemented as follows:

(i): Pre-configuration phase: A software defined network controller C has full visibility of the network topology, resources and established service level agreements for installed data flows within the software defined network. In step 0 of FIG. 2, the software defined network controller C pre-programs end-path forwarding elements, namely switches S1 and S3, with Packet Templates—PktTemp(SLA ping) and PktTemp(SLA pong)—for generation of probe packets, e.g. ping probe packets (designated as "ping" in FIG. 2) and/or optionally pong probe packets (designated as "pong" in FIG. 2), which can verify the SLAs by measuring QoS parameters of the data flows. Additionally, the software defined network controller C programs intermediate switches such as switch S2 of FIG. 2 with Packet Template—PktTemp(Ping Trigger)—to generate probe triggering packets in the data plane (a probe triggering packet is designated as "Ping Trigger" in FIG. 2). Each PacketTemplate that configures the automatic generation of probe triggering packets on a switch (designated as "PktTemp (Ping Trigger)" in FIG. 2) includes the value of a switch queue occupancy threshold as parameter threshold. Thus, a probe triggering packet will be generated on the configured intermediate switch when this threshold is exceeded. The generated probe triggering packets trigger, in turn, the generation of a ping probe packet in the end-path switch S1.

(ii): During the operation of the software defined network, if an intermediate switch experiences a high queue occupancy parameter "Q_len" exceeding the parameter threshold "Q_thresh" (cf. step 1 in FIG. 2) that has been previously configured in step 0 by the use of "PktTemp(Ping Trigger)", according to step 2 of FIG. 2 the event of exceeding the parameter threshold serves as a trigger for the Packet Template installed on switch S2 to generate a probe triggering packet (designated as "Ping Trigger" in FIG. 2) to reach and thus notify the end-path switch S1 and optionally end-path switch S2. The byte array of the Packet Template should resemble a valid packet that would reach the end-path switches of the path or paths that pass through the intermediate switch S2.

(iii): The reception of the probe triggering packets by end-path switch S1 and optionally also by end-path S2 will trigger an end-to-end service level agreement probing, which is illustrated by step 3 and step 4 of FIG. 2. The probe triggering packet "Ping trigger" of FIG. 2 can also include information about the intermediate switch S2, which identified the local congestion and generated this probe triggering packet. Thus, the end-to-end probing can be passed through the congested intermediate switch S2.

(iv): After the end-to-end service level agreement probing has been completed, the end-path switches decide locally whether the service level agreements are violated by evaluating the results of probe measurement campaigns. For example, the end-path switches identify a service level agreement violation in case they measure an RTT or a one-way delay that exceeds an SLA-compliant threshold, which has been preprogrammed by the software defined network controller C. In this regard, the SLA-compliant threshold refers to the path between the first end-path switch S1 and the second end-path switch S3.

(v): Once a service level agreement violation is detected on the examined path, the end-path switches S1 and/or S2 can initiate and/or execute a mechanism for performing service level agreement mitigation, e.g. as described in the context of the embodiments of FIG. 3, FIG. 4 and FIG. 5. Alternatively, the end-path switches S1 and/or S3 can just notify the software defined network controller about the service level agreement violation event.

According to embodiments of the invention there are several options for detecting service level agreement violations in OpenFlow-based switches. As previously described under section (iv) of FIG. 2, according to the embodiment of FIG. 2 there is the possibility to detect service level agreement violation by comparing measurement results with preconfigured service level agreement thresholds. As such, it may be needed to match on the probe packet embedded measurement result. While current OpenFlow specifications are limited in the number of predefined header fields one can match upon, defining additional header field for matching is possible through OpenFlow extension mechanisms. However, the current OpenFlow specification only allows exact or wildcard matching. Thus, in order to implement a compare operation in the match expression one may utilize some bitmask matching. This is however restrictive in terms of possible thresholds to express as they would need to fall on powers of 2. Therefore, according to an embodiment of the invention, it is suggested to extend OpenFlow matching capabilities to include the options for a greater/less than comparison.

Figure 3:
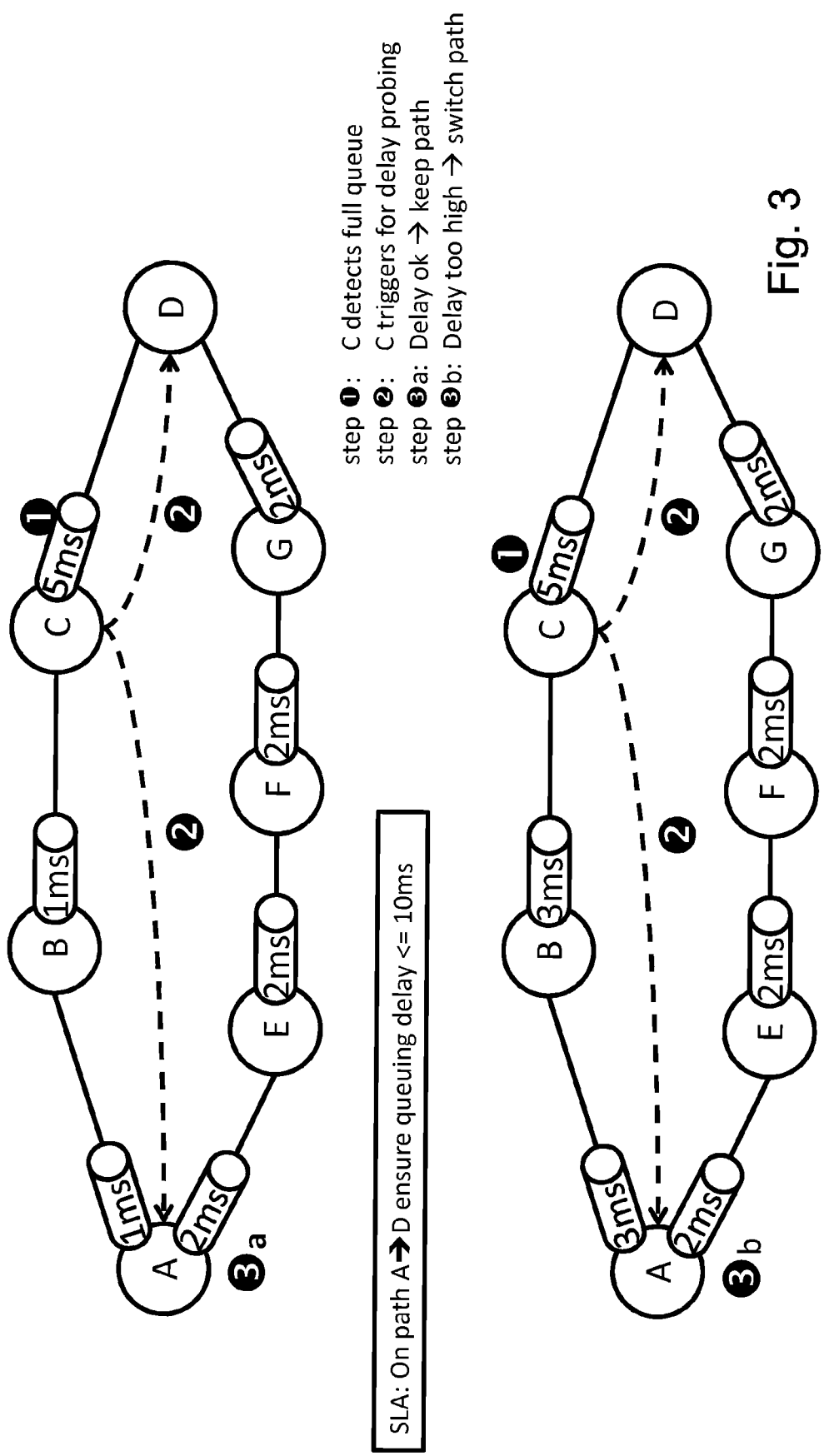
FIG. 3 is a schematic view illustrating a method and a software defined network according to another embodiment of the present invention.

FIG. 3 shows a schematic view illustrating a method and a software defined network according to another embodiment of the present invention, where a service level agreement violation detection mechanism is combined with a number of possible in-switch-assisted SLA mitigation options.

The embodiment illustrated by FIG. 3 describes an in-switch SLA mitigation mechanism, which performs path switchover, and may be implemented in the architecture according to the embodiment of FIG. 2. Whenever a service level agreement violation is detected, the data flow(s) corresponding to a violated service level agreement is forced to change their path in order to reassure the compliance to the service level agreement guarantees.

The in-switch service level agreement violation detection mechanism of the embodiment of FIG. 2 is implemented in the embodiment of FIG. 3, where the functionality of an in-switch-assisted service level agreement violation mitigation mechanism is additionally integrated as follows:

(i): It is considered the software defined network of FIG. 2 in which a service level agreement has been established, which requires for example 10 ms maximum queuing delay along the path between end-path forwarding element A and end-path forwarding element D. It is further considered that the intermediate forwarding elements B, C and end-path forwarding elements A, D have been preconfigured by the software defined network controller based on the service level agreement violation detection mechanism illustrated by FIG. 2.

(ii): The intermediate forwarding element C identifies a high queue occupation of the forwarding element, which results in a delay of 5 ms (step 1 in FIG. 3). Therefore, forwarding element C generates probe triggering packets using the preconfigured Packet Templates (step 2 in FIG. 3) in order to reach the endpoints—i.e. the end-path forwarding elements A and D—of the affected path.

(iii): After the endpoints—i.e. the end-path forwarding elements A and D—have received the probe triggering packets, they start generating probe packets in order to measure the queuing delay along the path between the endpoints A, D and that corresponds to the service level agreement.

(iv): The end-path forwarding elements A and/or D gather the measurement results, evaluate them to identify whether the service level agreement has been violated and decide upon it, for instance as follows:

(a): If the end-to-end service level agreement (SLA: "on path A-→D ensure a queuing delay<=10 ms") on the examined path—between end-path forwarding elements A and D via forwarding elements B, C—has not been violated, the same routing path over forwarding elements A, B, C, D (having a delay of 1 ms+1 ms+5 ms=7 ms) is kept (step 3a in FIG. 3).

(b): If the end-to-end service level agreement (SLA: "on path A-→D ensure a queuing delay<=10 ms") has been violated on the current path A, B, C, D having a delay of 3 ms+3 ms+5 ms=11 ms, a path switchover is performed using a protected path over forwarding elements A, E, F, G, D having a delay of 2 ms+2 ms+2 ms+2 ms=8 ms (step 3b in FIG. 2). The protected backup path—over forwarding elements A, E, F, G, D—is preconfigured to ensure a rapid reaction to the identification of a service level agreement violation, such that service level agreement guarantees can be maintained. The service level agreement is also be monitored over the protected path after the path switchover. These requirements can be met by pre-configuring the forwarding elements appropriately based on the mechanisms that are described above. Thus, a low delay protection with in-switch packet generation can be provided.

Hence, the embodiment of FIG. 3 provides service level agreement assurance via a path switchover mechanism.

An extension to the approach for service level agreement validation of FIG. 3 may be implemented as follows:

Instead of just checking the active path over forwarding elements A, B, C, D in step 3a or in step 3b, a further embodiment could be configured such that probe packets are also generated on the backup path over forwarding elements A, E, F, G, D in order to avoid changing to a path that also violates the service level agreement. Hence, a path would only be changed if the active path is violating the service level agreement and if the active path service level agreement metrics are worse than those of the backup path.

An alternative to changing the path as described above under section (iv).b) of FIG. 3, it is also possible to start throttling and/or dropping lower priority data traffic on the active path over forwarding elements A, B, C, D or moving such data traffic to another path, e.g. the path over forwarding elements A, E, F, G, D, through the software defined network.

Figure 4:
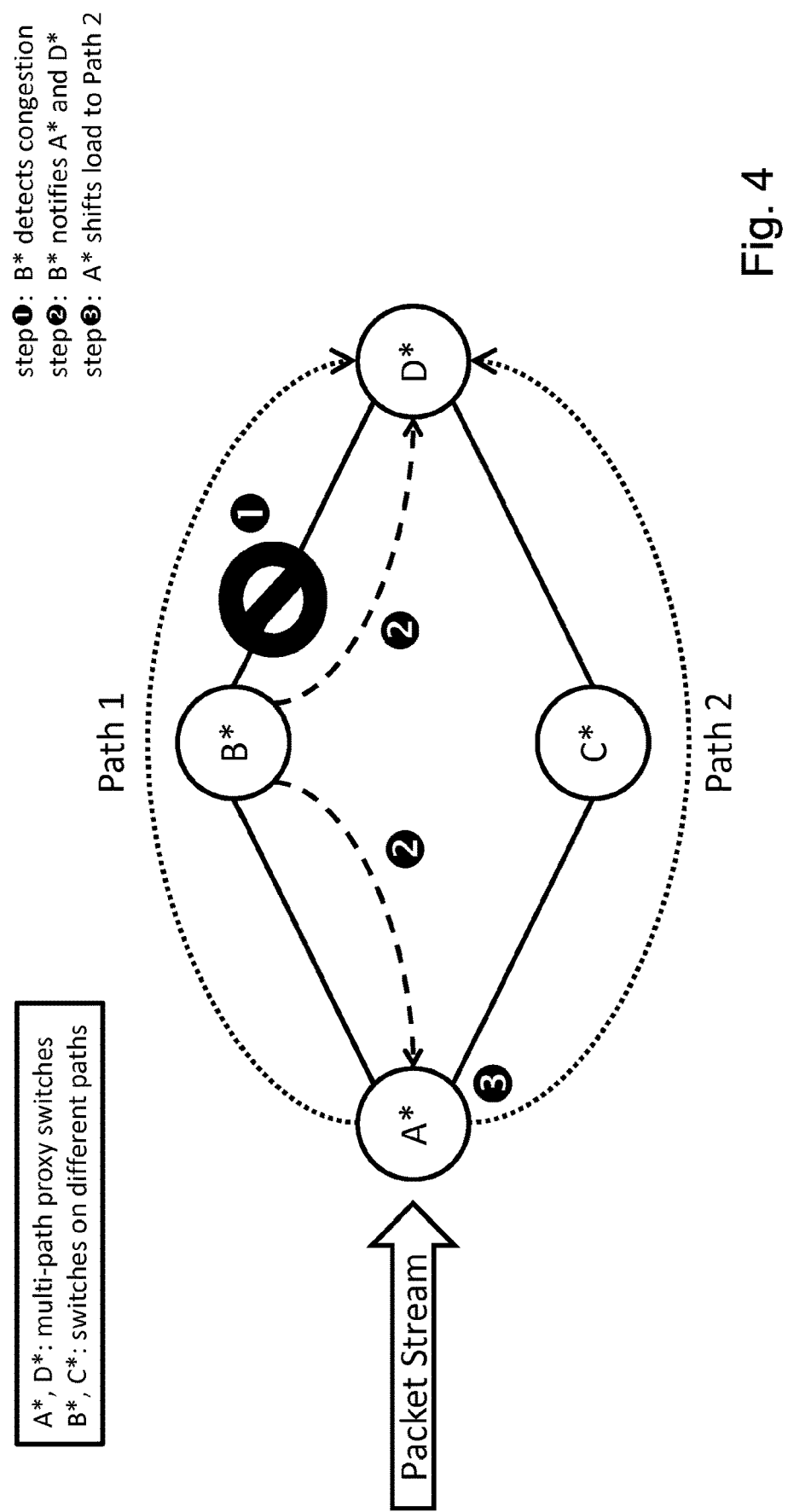
FIG. 4 is a schematic view illustrating a method and a software defined network according to another embodiment of the present invention.

FIG. 4 shows a schematic view illustrating a method and a software defined network according to another embodiment of the present invention.

The embodiment illustrated by FIG. 4 shows a service level agreement violation detection mechanism that is combined an in-switch SLA mitigation mechanism. In the embodiment of FIG. 4 a software defined network including multi-path proxy end-path switches is considered.

The in-switch SLA violation detection mechanism of the embodiments of FIG. 2 or FIG. 3 is implemented in the embodiment of FIG. 4, where the functionality of an inswitch-assisted SLA violation mitigation mechanism is additionally integrated as follows:

(i): It is considered the software defined network of FIG. 4 in which a service level agreement has been established that requires high bandwidth along the path between end-path switches A* and D*. It is also considered that the intermediate switch B* and the end-path switches A* and D* have been preconfigured by the software defined network controller based on the service level agreement violation detection mechanism.

(ii): The intermediate switch B* identifies a high queue occupancy, i.e. congestion, (cf. step 1 of FIG. 3) and generates probe triggering packets using the preconfigured Packet Template (step 2 of FIG. 4) in order to reach the end-path switches A* and D* of the affected path.

(iii): After the endpoints—i.e. the end-path switches A* and D*—have received the probe triggering packets, they start generating probe packets to measure the bandwidth along the path that corresponds to the service level agreement.

(iv): The end-path switches A* and/or D* gather the measurement results, evaluate them to identify whether the service level agreement has been violated and decide upon it, for instance as follows:

(a): If the end-to-end service level agreement on the examined path—between end-path switches A* and D* via intermediate switch B*—has not been violated, the same routing path (designated as "Path 1" in FIG. 4) over switches A*, B*, D* is kept.

(b): If the end-to-end service level agreement has been violated, the multi-path proxy switch A* shifts a part of its load to an alternative path (designated as "Path 2" in FIG. 4) in order to alleviate the congestion and to therefore maintain the service level agreement compliance (step 3 in FIG. 4). The alternative path to use (designated as "Path 2" in FIG. 4) has been preconfigured to ensure a rapid reaction to the identification of a service level agreement violation, such that the service level agreement guarantees can be maintained. The service level agreement is also monitored over both routing paths (i.e., the multi-path). These requirements can be met by pre-configuring the switches appropriately based on the mechanisms that were described above.

Hence, the embodiment of FIG. 4 provides SLA assurance with multi-path proxy switches as end-path forwarding elements.

Figure 5:
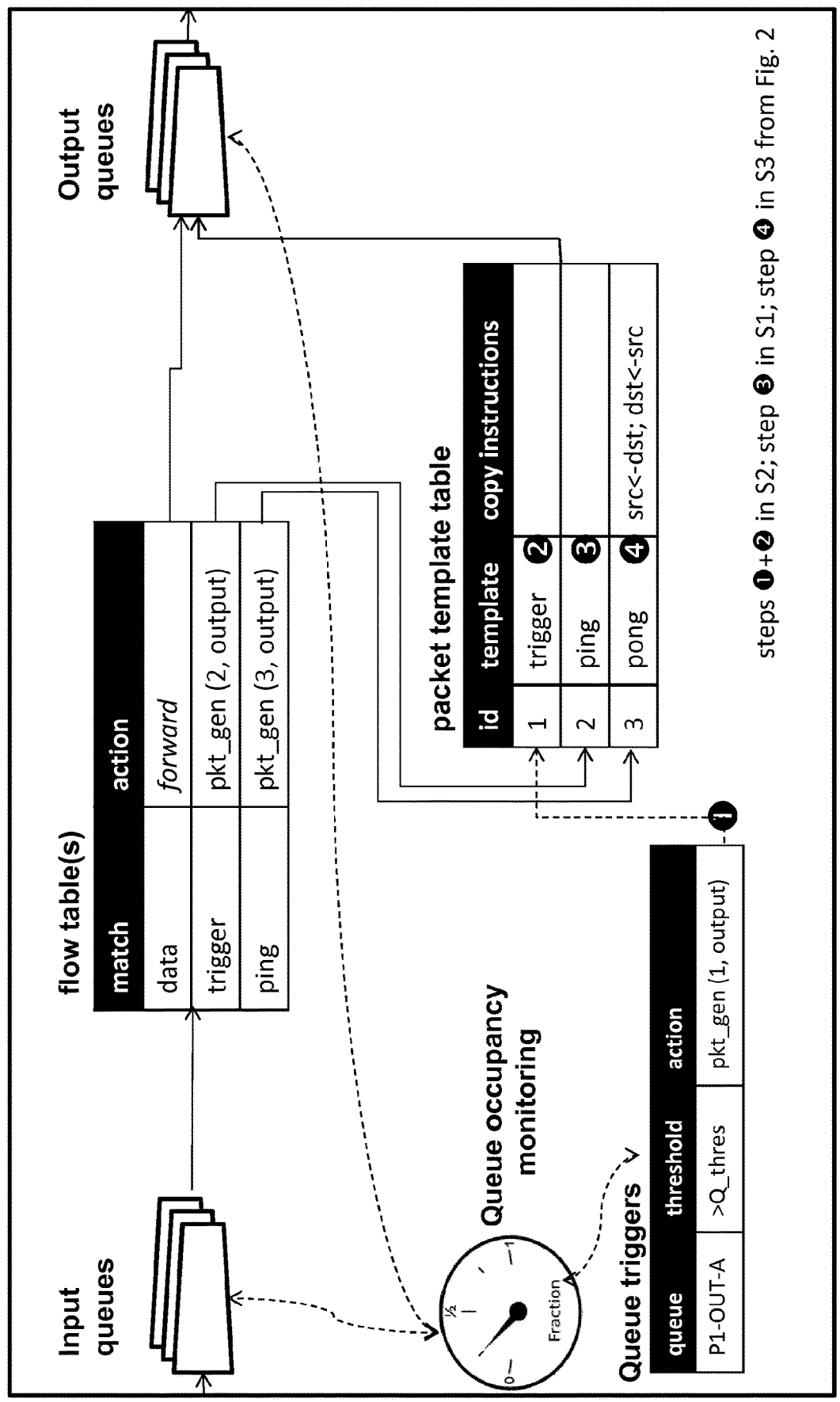
FIG. 5 is a schematic view illustrating a method and a software defined network according to another embodiment of the present invention.

FIG. 5 shows a schematic view illustrating a method and a software defined network according to another embodiment of the present invention in the connection with a corresponding forwarding element according to an embodiment of the present invention.

FIG. 5 shows an implementation of an SDN switch as forwarding element that supports the requirements of a method and a software defined network according to an embodiment of the present invention. The SDN switch of FIG. 5 includes the following main components:

an input queue per ingress port,
one or more flow tables that apply an action to the traffic identified by the match expression,
one or more output queues per egress port,
a queue occupancy monitoring mechanism including a queue trigger table, and
a packet template table.

The embodiment of FIG. 2 can be implemented in the context of the SDN switch illustrated by FIG. 5 as follows:

Step 0, packet template programming:

Switch S2 would receive a packet template (ID 1) to generate a probe triggering packet and an entry in its queue trigger table that specifies which queue to monitor (in this case P1-OUT-A, which would refer to output queue A of port P1), along with a condition (in this case filled more than parameter threshold Q_thres) and an action to execute when this condition becomes true. In this case the action is to generate a packet according to packet template ID 1 and output the generated packet, namely the probe triggering packet.

Switch S1 would receive a packet template (ID 2) to generate a ping probe packet and an entry in one of its flow tables that matches on probe triggering packets and if so executes the action to generate a packet according to packet template ID 2 and output the generated packet, namely the ping probe packet.

Switch S3 would receive a packet template (ID 3) to generate a pong probe packet and an entry in one of its flow tables that matches on ping probe packets and if so executes the action to generate a packet according to packet template ID 3 and output the generated packet, namely a pong probe packet.

Now, after the preparation step 0, in step 1: Switch S2 detects high queue occupancy.

Upon detecting high queue occupancy, i.e. congestion, switch S2 generates a probe triggering packet in step 2 (a probe triggering packet is designated as "Ping Trigger" in FIG. 2).

In step 3: Switch S1 receives the probe triggering packet and generates a ping probe packet in response.

The ping probe packet is received by switch S3 in step 4, where the respective pong probe packet is generated in order to perform the measurement task for the end-to-end probing, such that a service level agreement violation can be detected.

Furthermore, the queue triggers table might be extended with a mechanism that allows to retrigger, if the condition is still true after a programmable and/or predetermined time period.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following is a list of reference symbols used herein:
1 Internet Backbone
2 Point of Presence
3 Backbone Gateways
4 Aggregation Layer
5 Customer Edge
6 Network Management System
7 OSS/BSS
8 Monitoring Probes
9 Monitoring Manager
10 SLA
C SDN controller
S1 End-path switch
S2 intermediate switch
S3 End-path switch
A End-path forwarding element
B Forwarding element
C Forwarding element
D End-path forwarding element
E Forwarding element
F Forwarding element
G Forwarding element
A* End-path switch
B* Intermediate switch
C* Intermediate switch
D* End-path switch

The invention claimed is:

1. A method for supporting service level agreement monitoring in a software defined network,
wherein the software defined network comprises forwarding elements and a software defined network controller for controlling the forwarding elements,
wherein data flows are transmitted between a first end-path forwarding element, of the forwarding elements, and a second end-path forwarding element, of the forwarding elements, via at least one intermediate forwarding element, of the forwarding elements, between the first end-path forwarding element and the second end-path forwarding element;
wherein the software defined network controller configures the intermediate forwarding element such that a probe triggering packet is generated by the intermediate forwarding element based on local information of the intermediate forwarding element, the local information having been measured by the intermediate forwarding element,
wherein the software defined network controller configures at least one of the first end-path forwarding element or the second end-path forwarding element such that an end-to-end probing is triggered based on receiving the probe triggering packet, and
wherein the end-to-end probing is performed in order to detect a service level agreement violation.

2. The method according to claim 1, wherein the local information comprises one or more local information parameters impacting link quality including at least one of a queue occupancy parameter, a processing unit load parameter, a bit error parameter, a signal-to-noise ratio parameter, and a retransmission parameter.

3. The method according to claim 1, wherein the end-to-end probing comprises a measurement task, wherein the measurement task comprises a round-trip time measurement, a one-way delay measurement, a jitter measurement, a throughput measurement, and/or an available bandwidth estimation.

4. The method according to claim 1, wherein one or more probe packets for performing a measurement task of the end-to-end probing are generated by at least one of the first end-path forwarding element or the second end-path forwarding element.

5. The method according to claim 1, wherein generation and/or handling of the probe triggering packet and/or of one or more probe packets for performing the measuring task of the end-to-end probing is/are temporally decoupled from the software defined network controller.

6. The method according to claim 1, wherein one or more probe packets comprise a ping probe packet for performing a measuring task of the end-to-end probing, wherein the ping probe packet is generated by the first end-path forwarding element.

7. The method according to claim 1, wherein one or more probe packets comprise a pong probe packet for performing a measurement task of the end-to-end probing, wherein the pong probe packet is generated by the second end-path forwarding element.

8. The method according to claim 1, wherein the software defined network controller configures the forwarding elements by creating packet template information that is provided to the forwarding elements, wherein the packet template information comprises one or more packet templates and/or packet template handling instructions.

9. The method according to claim 8, wherein the forwarding elements are configured to generate one or more probe packets and/or the probe triggering packet based on the provided packet template information.

10. The method according to claim 8, wherein triggering instructions are provided to the forwarding elements by including them into the packet template information.

11. The method according to claim 10, wherein the triggering instructions comprise a parameter threshold for one or more local information parameters impacting link quality, wherein the parameter threshold is employed as a trigger for generating the probe triggering packet.

12. The method according to claim 10, wherein the triggering instructions comprise configuring a reception of a predetermined packet as a trigger for generating a probe packet for performing the end-to-end probing.

13. The method according to claim 1, wherein the probe triggering packet comprises information about the intermediate forwarding element that has generated the probe triggering packet due to local information with regard to link quality degradation.

14. The method according to claim 1, wherein upon completion of the end-to-end probing the first end-path forwarding element and/or the second end-path forwarding element decides locally whether a service level agreement violation is detected by evaluating result information obtained by the end-to-end probing, wherein the result information is evaluated based on a service level agreement compliant threshold provided by the software defined network controller.

15. The method according to claim 1, wherein a path switchover is performed, based upon a service level agreement violation being detected by the end-to-end probing.

16. The method according to claim 1, wherein a part of the first end-path forwarding element's load is shifted to a backup path, if a service level agreement violation is detected by the end-to-end probing.

17. The method according to claim 1, wherein an end-to-end probing is performed on a backup path.

18. The method according to claim 1, wherein Quality of Service remarking for promotion or demotion of the data flows is performed based upon a service level agreement violation being detected by the end-to-end probing.

19. A software defined network for supporting service level agreement monitoring, the software defined network comprising forwarding elements and a software defined network controller for controlling the forwarding elements,
  wherein the forwarding elements comprise a first end-path forwarding element, a second end-path forwarding element, and at least one intermediate forwarding element,
  wherein data flows are transmitted between the first end-path forwarding element and the second end-path forwarding element via the at least one intermediate forwarding element between the first end-path forwarding element and the second end-path forwarding element,
  wherein the software defined network controller is operable to configure the intermediate forwarding element such that a probe triggering packet is generated by the intermediate forwarding element based on local information of the intermediate forwarding element, the local information having been measured by the intermediate forwarding element,
  wherein the software defined network controller is further operable to configure at least one of said the first end-path forwarding element or the second end-path forwarding element such that an end-to-end probing is triggered, and
  wherein the end-to-end probing is performed in order to detect a service level agreement violation.

20. The method according to claim 1, wherein the local information has been measured passively by the intermediate forwarding element.

* * * * *